United States Patent
Klotz et al.

(10) Patent No.: US 7,936,688 B2
(45) Date of Patent: May 3, 2011

(54) PROTOCOL CROSS-PORT ANALYSIS

(75) Inventors: Steven Ronald Klotz, Austin, TX (US);
Jason David Mann, Austin, TX (US);
Timothy Lane McDaniel, Austin, TX (US)

(73) Assignee: JDS Uniphase Corporation, Milpitas, CA (US)

( * ) Notice: Subject to any disclaimer, the term of this patent is extended or adjusted under 35 U.S.C. 154(b) by 1531 days.

(21) Appl. No.: 10/947,818

(22) Filed: Sep. 22, 2004

(65) Prior Publication Data

US 2005/0063320 A1    Mar. 24, 2005

Related U.S. Application Data

(63) Continuation-in-part of application No. 10/661,901, filed on Sep. 12, 2003.

(60) Provisional application No. 60/504,751, filed on Sep. 22, 2003, provisional application No. 60/504,811, filed on Sep. 22, 2003, provisional application No. 60/411,027, filed on Sep. 16, 2002.

(51) Int. Cl.
*H04L 12/26* (2006.01)
(52) U.S. Cl. ............... 370/252; 370/469; 709/224
(58) Field of Classification Search .............. 370/230, 370/235, 242–245, 250, 252, 253, 465, 469; 709/223, 224, 232
See application file for complete search history.

(56) References Cited

U.S. PATENT DOCUMENTS

| | | | |
|---|---|---|---|
| 5,535,193 A * | 7/1996 | Zhang et al. | 370/253 |
| 6,266,700 B1 * | 7/2001 | Baker et al. | 709/230 |
| 6,321,338 B1 * | 11/2001 | Porras et al. | 726/25 |
| 6,545,982 B1 * | 4/2003 | Murthy et al. | 370/245 |
| 6,604,139 B1 * | 8/2003 | Sajina et al. | 709/224 |
| 6,745,351 B1 * | 6/2004 | Mastro | 714/57 |
| 7,317,693 B1 * | 1/2008 | Roesch et al. | 370/252 |

FOREIGN PATENT DOCUMENTS

WO      WO 0128060 A1 *    4/2001
WO      WO 2006082282 A1 * 8/2006

OTHER PUBLICATIONS

Haugdahl, J.S., "Benchmarking LAN Protocol Analyzers," Proceedings of the 13th Conference on Local Computer Networks, 1998. Oct. 1998, pp. 375-384.*

* cited by examiner

*Primary Examiner* — Donald L Mills
(74) *Attorney, Agent, or Firm* — Matthew A. Pequignot; Pequignot + Myers LLC (57) ABSTRACT

A cross-port analysis method is provided to analyze multi-channel traces in a network. More particularly, cross-port analysis is a method allowing for aggregate network analysis capabilities from a multi-channel analyzer. This can be performed as traces of network traffic generated by each port on two or more analyzers. Precise timestamps are recorded for each trace and the topology of devices on the network is determined. An expert analysis is then performed on the captured data traces.

13 Claims, 5 Drawing Sheets

PROTOCOL CROSS-PORT ANALYSIS

CROSS REFERENCE TO RELATED APPLICATIONS

This application claims the benefit of U.S. Provisional Application Nos. 60/504,751, filed Sep. 22, 2003; and 60/504,811, filed Sep. 22, 2003. Both applications are incorporated herein by reference in their entireties. This application is a continuation-in-part of U.S. patent application Ser. No. 10/661,901, filed Sep. 12, 2003, which claims priority of U.S. Provisional Application No. 60/411,027 filed on Sep. 16, 2002.

BACKGROUND OF THE INVENTION

1. The Field of the Invention

The present invention generally relates to data analysis in a network. More particularly, the present invention relates to intelligent analysis of a plurality of traces received from a plurality of protocol analyzers in a network.

2. The Relevant Technology

Computer and data communications networks continue to develop and expand due to declining costs, improved performance of computer and networking equipment, and increasing demand for communication bandwidth. Generally, networks are shared access arrangements in which several network devices, such as computers or workstations (collectively termed "stations"), are interconnected by a common communications medium that allows the users of the stations to share computing resources, such as file servers, printers, and storage, as well as application software and user work product.

Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

The respective networks may range from bridged segments of local area networks (LANs) located in a department or single floor of a building, to a wide area network (WAN) wherein a plurality of LANs are geographically distributed and interconnected through switching devices, such as routers or bridges. Alternately, the networks may represent Storage Area Networks (SAN) or Network Attached Storage (NAS) configuration deployed in LAN, WAN or more or less private interconnections using specialized high-speed protocols, such as Fibre Channel (FC) or Serial Attached SCSI (SAS). The network communication medium may be wired, such as coaxial, twisted pair, or fiber optic cable, or wireless, such as a cellular or radio frequency (RF) transmission system.

Depending on performance requirements, the different LANs within a WAN may have different physical connection configurations (or "topologies"), such as Ethernet or Token Ring. They may also have different vendor proprietary LAN hardware and software with different signal protocols that govern the exchange of information between the stations in the LAN. When these different topology and different protocol LANs are interconnected, which is referred to as "inter-networking," there must be an exchange of signal protocols. The open Standards Interconnect (OSI) seven layer interconnect model developed by the International Organization for Standardization describes how information is exchanged between software applications on workstations in different networks by passing the information through a hierarchy of protocol layers.

As a result, networks present a complicated arrangement of devices in various topologies capable of supporting different protocols. To ensure performance, networks must be managed. Management includes monitoring signal traffic for trends related to signal volume, routing, and transmission speed to proactively plan for network growth and to avoid signal congestion and network downtime. This also includes detecting and diagnosing network operational problems which affect performance to both prevent problems and to restore network operation with minimum downtime following the detection of a problem. These are the responsibilities of a network administrator, whose network duties require both anticipation of performance changes and diagnosis of performance failures.

The administrator's responsibilities require the availability of network statistics related to performance, and network administrators commonly collect an archive of network management statistics that indicate network utilization, growth and reliability, facilitate near-term problem isolation, and longer-term network planning. In general, categories of statistics to be monitored include those related to utilization, performance, availability, and stability) degrade service, including: number of fast line status transitions, number of fast root changes (root flapping, next hop count stability, and short term ICM behavior).

In addition, and as communication networks have increased in number, size and complexity, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Exemplary causes of network performance problems include the transmission of unnecessarily small frames of information, inefficient or incorrect routing of information, and improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of communications systems.

The data to produce the foregoing statistics and help identify problems can be collected by instruments known as protocol analyzers. In particular, protocol analyzers are used as diagnostic and testing tools at various stages of the development, integration and maintenance of electronic computing devices. Typically, a protocol analyzer is designed for use with a particular electrical communication interface protocol, such as ATA, SCSI, Ethernet, or FC. In a typical use, the protocol analyzer is connected to the communication interface of the computing system being tested to record communication activity on the interface. The communication activity is captured and recorded in a dedicated trace buffer associated with the protocol analyzer, and then analyzed or presented to the user for the purpose of diagnosing, testing or maintaining the communication interface in a trace viewer format. In a given environment, one or more analyzers may be placed in selected locations according to the devices of interest. One known analyzer is the GTX Analyzer commercially from Finisar Corporation of Sunnyvale, Calif.

One limitation with many existing protocol analyzers is that such analyzers do not actually "analyze" the data captured by the analyzer. Rather, the data captured by an analyzer is presented to a user, for example in a trace file, for inspection and determination of whatever faults, errors, or other unwanted conditions exist in the network. Since a trace file may easily contain several million entries, manual or brute force analysis of these traces is extremely time consuming.

Another limitation with conventional tools that perform a very limited degree of real intelligent analysis (as opposed to merely capturing data) is they do not support numerous data transmission technologies (including several emerging and popular technologies) such FC.

FC is a general name for an integrated set of standards being developed by ANSI (American National Standards Institute), whose purpose is to act as a universal high-speed interface for computers and mass storage. FC is designed to combine the best features of channels and networks, namely the simplicity and speed of channel communications and the flexibility and interconnectivity of protocol-based network communications. FC is a highly-reliable, gigabit interconnect technology that allows concurrent communications among workstations, mainframes, servers, data storage systems, and other peripherals using well-know protocols, such as Systems Interface (SCSI), Internet protocol (IP), FICON and VI protocols. FC provides interconnect systems for multiple topologies (e.g., point-to-point, switched, and arbitrated loop (FC-AL)) that can scale to a total system bandwidth on the order of terabits per second. One area in which FC has been implemented with significant success is in storage environments such as Storage Area Networks (SANs) and Network Attached Storage (NAS). However, system performance limitations may be introduced as a result of inefficient system configuration, e.g., where a legacy device on a network bus determines the overall bus speed. In such situations, intelligent analysis of the network is clearly beneficial to facilitate optimization of its configuration and/or diagnosis of faults.

Typical serial analyzers contain two ports, one to capture transmitted information from a device, the other to capture the information from the opposite direction that is directed to the device. A typical analyzer allows for searching and filtering of the data, but the data is presented without any regards to the actual traffic or topology involved. Searches and filters are fairly simple bit and byte-level matching comparisons on single events. As network analysis evolves, however, it becomes increasingly important to look beyond the single analyzer and simultaneously evaluate the results of multiple analyzers. Such multi-channel analyzers are made up of multiple systems. Still, conventional multi-channel analyzers do not demonstrate the capabilities to present an aggregate analysis that details traffic behavior patterns occurring between devices in a network.

Therefore, there exists a continuing need for improved intelligent analysis tools capable of efficiently and accurately analyzing various networks. In particular, there is a continuing need to provide intelligent analysis tools for multi-channel analyzers.

BRIEF SUMMARY OF THE INVENTION

The present invention relates generally to a cross-port analysis method for networks. Cross-port analysis generally includes the ability to analyze multichannel traces obtained from the network, which allows for port to port analysis to be conducted.

Accordingly, a first example embodiment of the invention is a method for analyzing a network. The method generally includes: providing a plurality of analyzers in a communication network, wherein each analyzer is configured to monitor traffic to and from an element of the network and has a synchronized timestamp mechanism; capturing a data trace with each of the plurality of analyzers; adding precise timestamp information to each captured data trace; determining the topology of the network from frame information on the captured data traces; and conducting an expert analysis process on the captured data traces.

Another example embodiment of the invention is also a method for analyzing a network. This method generally includes: in a network, providing a first analyzer in communication with a first element to be monitored and a second analyzer in communication with a second element to be monitored; capturing a data trace with the first analyzer and a data trace with the second analyzer; adding precise timestamp information to each captured data trace; identifying a plurality of frames within each data trace, each frame having a source identifier or a destination identifier that references a first port; determining a pathway between the first port and a second port from frame information on the plurality of frames; and conducting an expert analysis process on the captured data traces.

The expert analysis may include any of a number of processes, including, for example: determining a transmission latency between two of the analyzers; the identification of pending frames; the detection of out of order frames between a source and a destination; the detection of out of order frames in networked traffic; shortest path first verification; burst rate capabilities, frame size distribution versus latency time; sequence interleaving for a port; and bus utilization for a port.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Generally, embodiments of the invention provide a cross-port analysis method for networks. As used herein, the term, "cross-port analysis" refers to the ability to analyze multi-channel traces in a network. More particularly, cross-port analysis is a method allowing for aggregate network analysis capabilities from a multi-channel analyzer. For example, cross-port analysis allows a user to gain additional insight into network activity by doing a port or port expert analysis rather than simply a single port analysis. This is accomplished as a pair of analyzers, for example, capture unique viewpoints within the network. A precise timestamp that is synchronized between the analyzers can be used to help correlate data for the expert analysis.

More particularly, a typical serial analyzer contains two ports, one to capture transmitted information from a device and another to capture the received information from the opposite direction. A multi-channel analyzer generally includes a plurality of serial analyzers. Although a typical analyzer allows for searching and filtering of data, the data is generally presented without regard to the actual traffic or topology involved. Searches and filters are fairly simple bit and byte level matching comparisons on single events. The present invention recognizes that it can be important to look beyond a single analyzer for expert analysis and include multiple analyzer analysis capabilities. Although many analyzer companies are now shipping multi-channel analysis capabilities, none demonstrate the capability to present an aggregate analysis that details traffic behavior patterns occurring between the links. The present invention satisfies this need through by aggregating traces from multiple analyzers in a way that an expert analysis can be performed thereon.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Example Network Topologies

Figure 1:
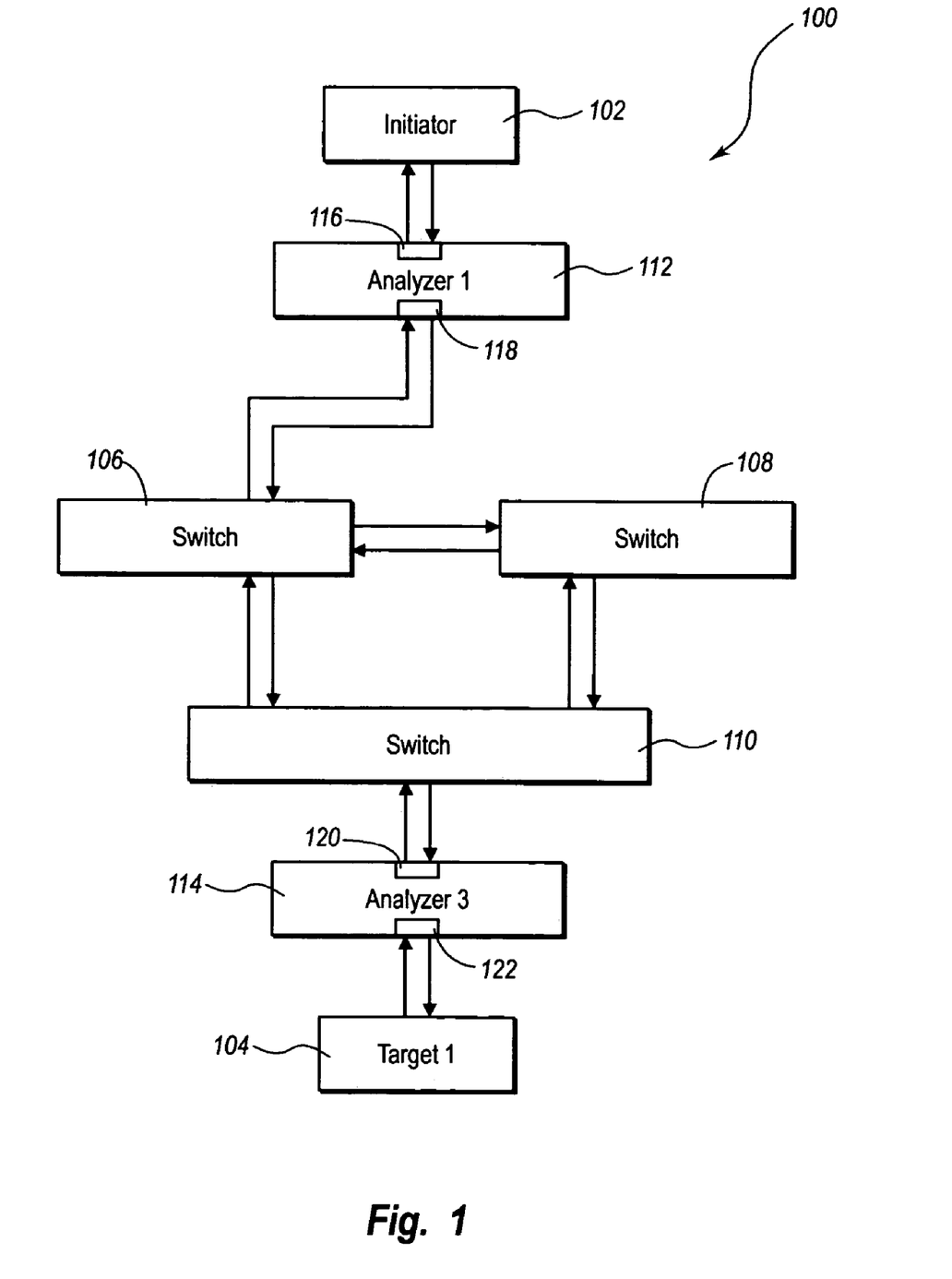
FIG. 1 illustrates a first example network architecture in which embodiments of the invention can be practiced.

Depicted in FIG. 1 is an example of a networked system in which one embodiment of the invention can be practiced. In this model, there is an initiator device 102 communicating with a target device 104. The network fabric that they are communicating on has three switches 106, 108, 110. Two serial analyzers 112, 114 each include two ports (or channels) that are in-line with the network for analysis. For a point of reference, ports closer to the initiator device will be referred to as downstream in that signals sent by the initiator will travel downstream and preferably be traced by the nearside ports. Conversely, ports further from the initiator, or closer to the target, will be referred to as upstream. While these designations may lose significance or be difficult to identify in some devices in more complex networks, they will suffice for the discussion related to FIG. 1.

Accordingly, analyzer 112 has downstream port 116 and upstream port 118. Similarly, analyzer 114 has upstream port 122 and downstream port 120. Analyzer 112 monitors the characteristics of the initiator 102 while analyzer 114 monitors the characteristics of the target 104. In this example, frames flow from the initiator 102 to the target 104 via either two switches (switches 106, 110) or three switches (switches 106, 108, 110). Similarly, frames traveling from the target 104 to the initiator 102 can pass through either two or three switches.

The process of performing a cross-port analysis according to the invention includes first identifying the topology on both the initiator and target links. The topology is determined by first locating and identifying visible port paths within the analyzed fabric. Further details regarding how the topology is determined are provided below. Note that in this example, however, there are only two visible devices in the network, analyzer 112 and analyzer 114, as data collection was not performed at the switches. The two visible port pathways in this example are therefore port 116 to port 120 and port 122 to port 118. It is preferred to communicate between ports in this fashion so that the distance traveled can be consistently measured at the near or far side of analyzers. In addition, in a more complex network with analyzers inserted between switches 106, 108, and 110, the paths would multiply so that paths would be identified not only between analyzers but also to each of the switches.

Additional details regarding compatible methods for determining the topology of devices in a network are provided in U.S. patent application Ser. No. 10/661,901, entitled "Network Analysis Tool Detection," filed Sep. 12, 2003, and incorporated herein by reference in its entirety.

Figure 2:
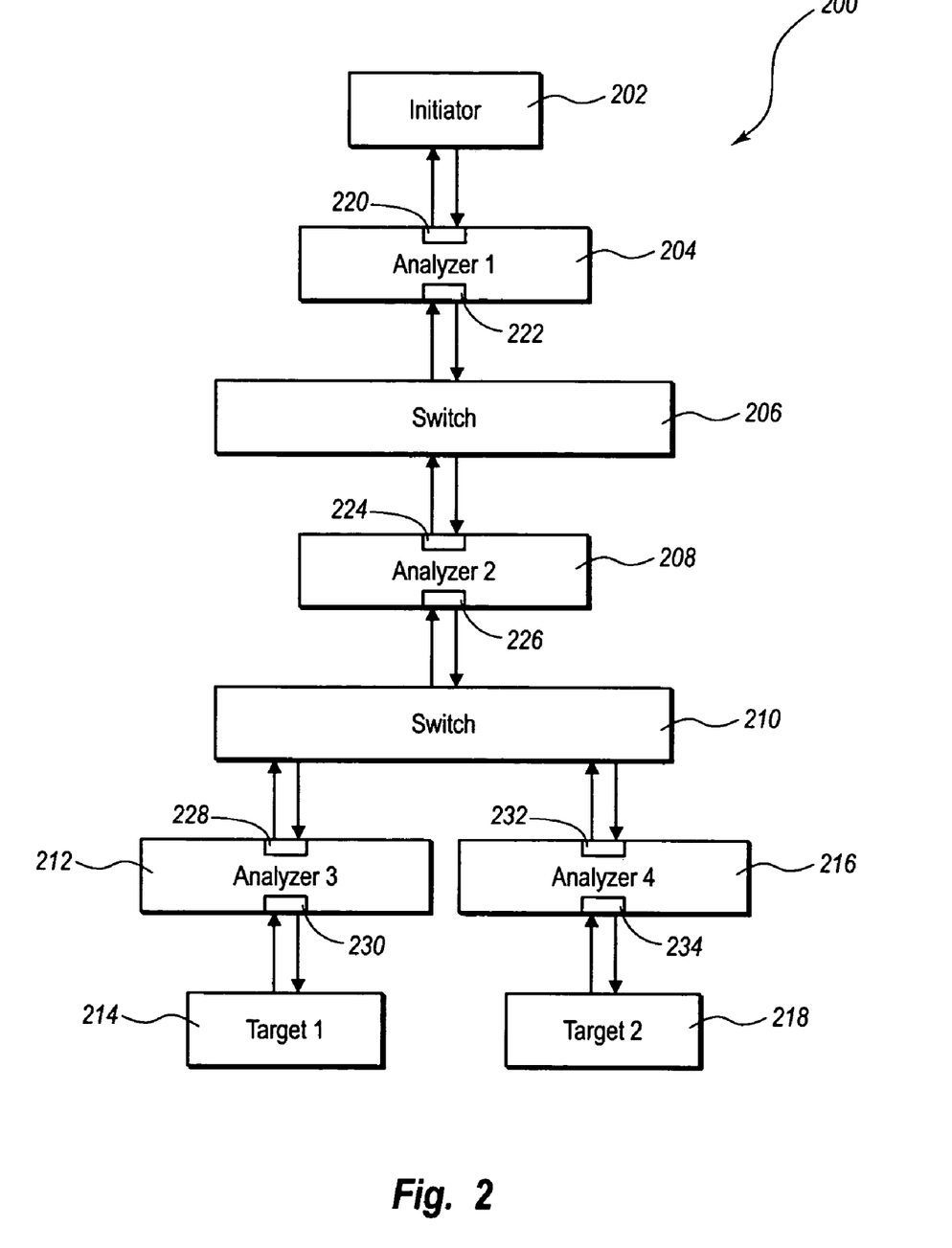
FIG. 2 illustrates a second example network architecture in which embodiments of the invention can be practiced.

A network topology 200 including multiple targets and additional analyzers is depicted in FIG. 2. Particularly, network topology 200 includes two targets 214, 218, rather than one. Two switches 206, 210 are located in the path leading between the initiator 202 and the targets 214, 218. This example also includes four analyzers so that more information can be gathered about the network and about each device depicted in the topology. Pathways leading away from the initiator 202 in this example include port 220 to port 224, port 224 to port 228, and port 224 to port 232. Pathways leading away from either target 214 or target 218 include port 226 to port 222, port 230 to port 226, and port 234 to port 226. It is important in analyzing traffic through a network to ensure that traffic is compared between the right analyzer ports to avoid inconsistent measurements.

Figure 6:
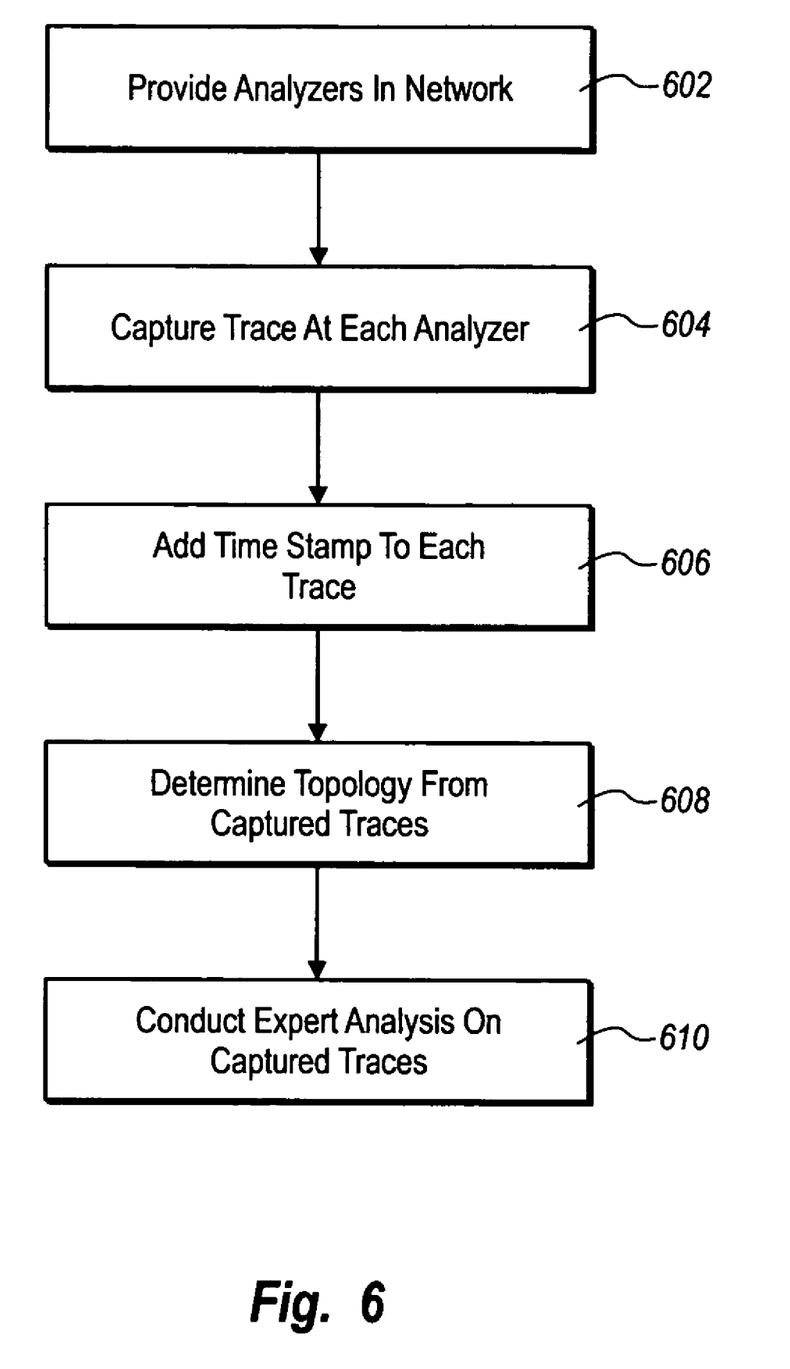
FIG. 6 illustrates in block form one example method of performing a cross-port analysis according to one embodiment of the invention.

With reference to FIG. 6, the process for performing the cross-port analysis of the invention may be generally described as follows. Initially, as depicted in block 602, a plurality of analyzers, such as analyzers 112, 114 in FIG. 1 and analyzers 204, 208, 212, and 216 in FIG. 2, are provided to monitor the desired initiators, targets, switches or other devices in the network. Next a trace is collected at each analyzer as desired with desired trace information, as indicated by block 604. Individual data frames are identified within each trace. More particularly, the frames are collected at the transmit sides of each port. For example, traces could be generated at ports 116 and 120 in FIG. 1, or at ports 220, 224, and 228 in FIG. 2. As previously noted, this ensures accurate time measurements and isolation of the correct devices for analysis.

In addition, precise time stamp information is added to each generated trace or capture frame, as indicated at block

606. Each frame therefore preferably includes the following information: frame start time; frame S_ID (Source Identifier; frame D_ID (Destination Identifier); frame length; frame CRC (cyclic redundancy check); and/or frame record/event number. The frame start time can be used as a time stamp so that the transmission duration can be accurately measured, either between analyzers or between other devices. The frame S_ID and frame D_ID ensure that a frame is relayed accurately between the intended devices in a network. Frame length and frame CRC are both used to ensure accuracy in transmission of the frame. Finally, the frame record/event number field can be used to record additional information about the frame as desired.

From the above frame information on the captured traces, the network topology is next determined, as indicated by block 608. For example, once it is determined that a frame has traversed a port, all frames with the same Zone Address in the source or destination as that frame are expected to traverse that port same port. With reference to FIG. 1, for example, upon identifying that a frame has traversed port 116, a collection of frames that have also traversed port 116, with selected identifying information, may include:

(1) Port 116: S_ID: 100100, D_ID: 1002ef, CRC: 0xaaaaaaaa;
(2) Port 122: S_ID: 1002ef, D_ID: 100100, CRC: 0xbbbbbbbb;
(3) Port 116: S_ID: 100100, D_ID: 100300, CRC:0xccccccc;
(4) Port 118: S_ID: 1002ef, D_ID: 100100, CRC:0xdddddddd;
(5) Port 120: S_ID: 100100, D_ID: 1002ef, CRC: 0xaaaaaaaa; and
(6) Port 118: S_ID: 1002ef, D_ID: 100100, CRC: 0xbbbbbbbb.

In this listing of frames, ID: 100100 refers to initiator 102; ID: 1002ef refers to target 104; ID: 1001xx refers to switch 106; and ID: 1002xx refers to switch 110. Initially, because the software implementing the invention does not yet know that a port path exists, and since port 118 and port 122 are known to be in communication with switches 106 and 110, the software can create a "stack" context for this port pair, e.g. ID: 1001xx for switch 106 and ID: 1002xx for switch 110 and add the context. This process of adding stack contexts for switches 106 and 110 can be repeated for frame 2. For frame 3, a stack context can be added for switch 106 based on the S_ID 100100, but the D_ID is unknown so no corresponding context is added.

Frame 4 is the second frame with S_ID: 1002ef, D_ID: 100100. Frame 4 differs from Frame 2 in the port however since frame 4 is at port 118 while frame 2 is at port 122. Accordingly, it is now known that frames from port 122 are being delivered to port 118 and that the software has seen enough information to measure the path.

Similarly, frame 5 shows that the first frame (identified by CRC; S_ID, and D_ID) has flowed through the fabric from port 116 to port 120). The software now knows there is a path from port 116 to port 120. The frame 1 from the initial step can now be removed from the stack and processed for statistics. When removing the frame from the stack, it is important to know from this point forward if the frames are being pulled from the stack in order. For example, any subsequent frames from port 116 to port 120 should be seen in the same order on port 120 as they were seen added to port 116's stack. This is important for debugging checks (lost frames, out of order delivery, etc.).

Finally, frame 6 shows that the second frame has flowed through the fabric from port 122 to port 118. The software now knows there is a path from port 122 to port 118. The topology between initiator 102, analyzer 112, switch 106, switch 110, analyzer 114, and target 104 has been determined. Finally, an expert analysis can be performed on some or all of the captured traces, as indicated by block 610.

Additionally, it should be noted that frame 3 does not have a correlated frame because the D_ID lies outside the topology of interest. The methods of the invention preferably include a mechanism for removing this frame a stack of frames under analysis after a certain period of time or upon collection of a certain number of frames.

Expert Analysis Processes

Once the paths have been identified within the relevant portions of a network and a set of traces from multiple analyzers has been collected, expert analysis techniques involving protocol and traffic flow can be used to identify characteristics of the network. These characteristics may include, for example, determining a transmission latency between two of the analyzers; the identification of pending frames; the detection of out of order frames between a source and a destination; the detection of out of order frames in networked traffic; shortest path first verification; burst rate capabilities, frame size distribution versus latency time; sequence interleaving for a port; and bus utilization for a port.

Various methods of intelligently analyzing network traffic at a single analyzer by identifying the topology and protocols active within the network and rebuilding conversations based on complex algorithms are disclosed in copending U.S. patent application Ser. No. 10/661,716, entitled, "Network Analysis Omniscient Loop State Machine," filed Sep. 12, 2003, and incorporated herein by reference in its entirety.

Figure 3A:
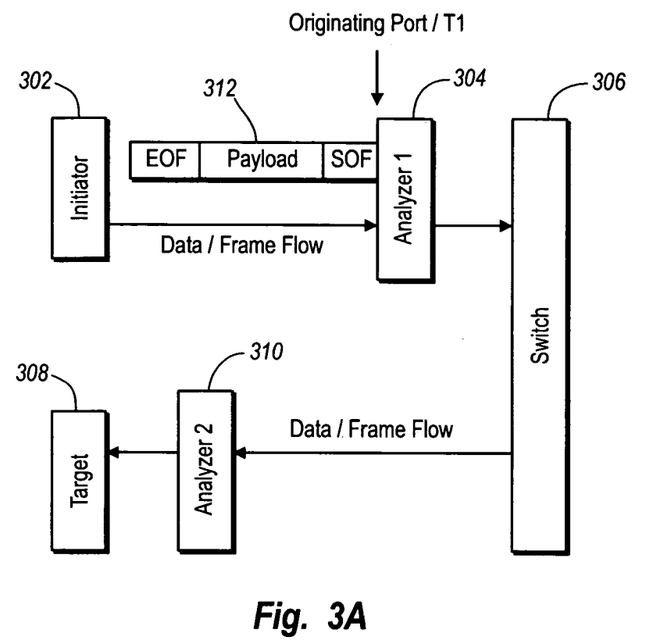
FIG. 3A illustrates the receipt, at a first analyzer, of a frame for the determination of transmission latencies according to one embodiment of the invention.
Figure 3B:
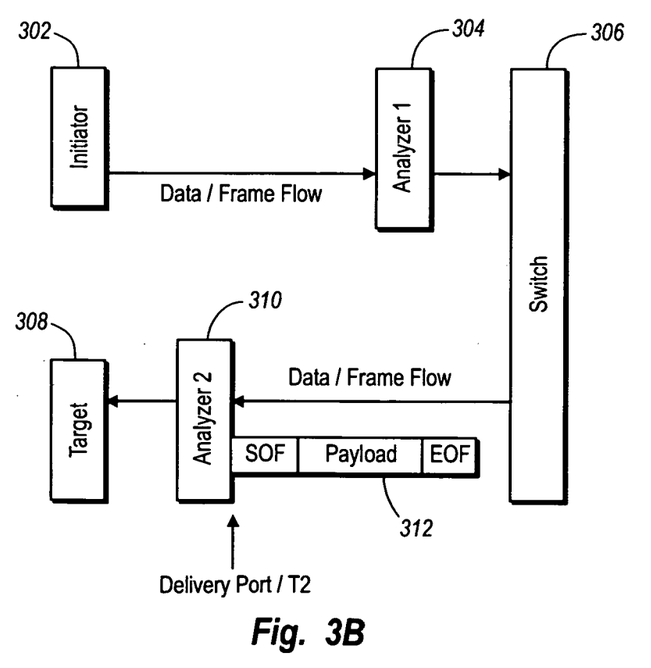
FIG. 3B illustrates the receipt, at a second analyzer, of a frame for determination of transmission latencies according to one embodiment of the invention.

For cross-port analysis according to the invention, the following metrics can be calculated. Referring now to FIG. 3A and FIG. 3B, a first example metric analysis that can be performed on the network system is latency timing. In the figures, an exemplary frame is depicted traveling between analyzers in a networked system. The example network includes an initiator 302 sending a frame 312 to a initiator/target 308 via a switch 306. The frame 312 includes various segments, including at least a start of frame (SOF) designator, a payload, and an end of frame (EOF) designator. A first analyzer 304 is positioned to monitor the initiator 302 and a second analyzer 310 is positioned to monitor the target 308.

Latency measurements, in conjunction with expert analysis techniques, can be used to identify congestion problems as well as to make bandwidth calculations. These measurements show the elapsed time from when the SOF (Fibre Channel) or last byte of preamble (Gigabit Ethernet) enters a first analyzer 304 to the time at which the SOF or preamble enters a second analyzer 310 downstream. Typical networks and SAN configurations will have consistent sub-millisecond latency. Latency measurements are therefore helpful because multi-millisecond values or higher normally indicate severe forms of congestion, unless there is a slow network in-between the analyzer points (i.e. a 10 mbit or ATM route between the Gigabit Ethernet switches). Of course, there are situations, such as the presence of Arbitrated Loop ports (NL_PORTS), that may make latency measurements less indicative of what is actually happening on the network. However, knowledge of what device and systems are operating can allow a user to know if such devices and systems are skewing the results.

By way of example, typical latency timings through a properly running Gigabit Ethernet network tend to be very low (1-2 microseconds) as many Gigabit Ethernet switches perform cut-through routing techniques in which frames rarely get buffered. When heavy congestion occurs and multiple devices are transmitting to a single port, the latency times will increase proportionally across the switch. It is very uncommon to see a Gigabit Ethernet only network with latency times greater than about 500 microseconds. When Gigabit Ethernet networks are down-rated or routed through a slower link (i.e. ATM, T1, 10/100 Ethernet), latency times may increase sharply. The latency time may also increase due to distance between the devices and/or switches.

In the depicted example, frame 312 is seen in FIG. 3A after being sent by the initiator and arriving at the originating port on analyzer 304 at a time T1. Note that analyzer 304 is considered to have the "Originating Port" and the timestamp of the frame is indicated by the "T1" mark. In addition, although not depicted, the timestamp may represent the first byte time of the frame. Next, the frame 312 passes through analyzer 304, through the switch 306 and emerges at the destination or "Delivery Port" of analyzer 310 at timestamp T2. The latency timing is calculated as T2−T1. For consistency, the timestamp remains as the first byte of the frame, not the ending time of the frame, as suggested in FIG. 3B by the order of the frames arriving at analyzer 310.

Several latency calculations that can be determined across a given port path for a series of frames include, for example, average latency, minimum latency, maximum latency, and total latency.

Another metric calculation that can be performed in a cross-port analysis is the identification of pending frames. Pending frames are frames that have been sent into the network, but have not yet been delivered to the next downstream port. Identifying pending frames is helpful to identify congestion problems or delivery ordering within the network. In Fibre Channel systems, for example, there is a strong correlation between the number of pending frames and credits that are available to the endpoints. In Gigabit Ethernet, however, most switches are of the cut-through variety and rarely buffer large amounts of frames.

In Fibre Channel, typical fabric policies will begin to utilize flow-control methods to avoid this sort of potential congestion/bottle-neck situation. The flow-control will be performed by reducing the number and frequency of credits (R_RDY ordered sets) given to incoming devices or switches on the fabric. Some fabrics, however, never behave this way and simply keep accumulating more frames at the delivery port, awaiting credits from one or more devices on the delivery port so that the frames can be transmitted. In this situation, if the number of pending frames gets too high, it is possible that frames (especially class 3 frames) will be discarded as the frames are aged.

In Fibre Channel Arbitrated Loops with multiple devices participating on the loop, large variations in the number of pending frames at any given time can occur. This is due to the nature of the loop. If one device has the loop open while sending frames to the switch, the switch cannot send frames for another destination port until the loop has been relinquished.

In Gigabit Ethernet networks running IP and TCP protocols, high pending frame counts can indicate severe congestion. These frames can (and will be in many cases) dropped by the switches. When frames are identified as dropped by the cross-port analysis, the switch or destination should transmit a message, such as an ICMP Source Quench message, back to the source to indicate that it is being overrun.

Several pending frame calculations that can be determined across a given port path for a series of frames include, for example: an identification of specific pending frames at a given time, the minimum number of pending frames at any given time in a selected time frame, and the maximum number of pending frames at any given time in a selected time frame. One additional calculation that can be very helpful is an oldest pending frame in a given sample calculation. This is helpful for debugging lost, dropped, or highly congested network paths in which one or more frames are stalled or undeliverable.

Next, the cross-port analysis methods of the present invention can monitor the frame ordering for in-order delivery across all of the ports. The methods also identify errors whenever a frame is re-ordered or dropped for a source/destination pair (out of order frame by source/destination) or when the network reorders frames for multiple ports or destinations (out of order frame in network).

Figure 4:
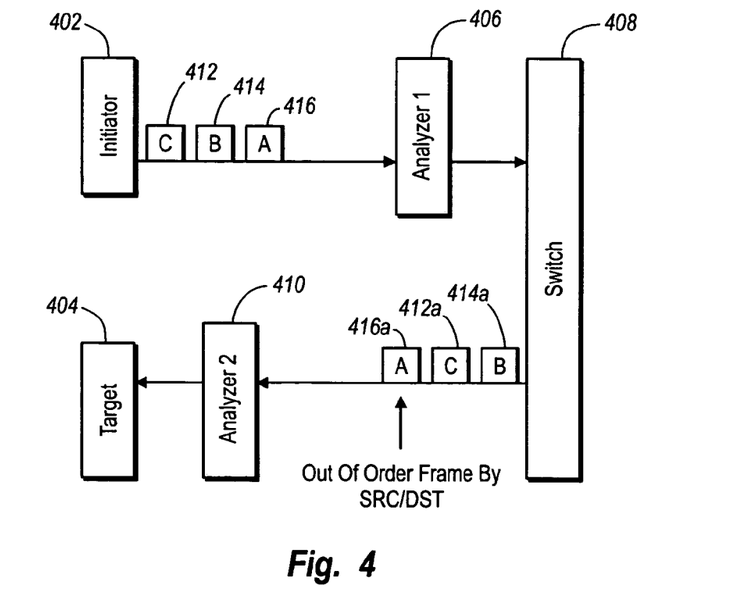
FIG. 4 illustrates the detection of an out of order frame according to one embodiment of the invention.

With reference to FIG. 4, an example networked system related to the detection of out of order frames between a source and a destination is depicted. In this example, an initiator 402 sends frame A (416), frame B (414), and frame C (412), all with the same source and destination to the target. Analyzer 406 first identifies the frames and so the same frames are expected to be delivered in the same order to initiator/target 404 via switch 408 and analyzer 410. However, on analyzer 410 (and thus the target), the frames are delivered in the order: A, C, B. In this situation, a metric report detailing the out of order frames by source/destination can be advantageously produced with the following properties by recording the time each frame is traced at each analyzer. More particularly, the metric report could be configured to state, for each frame: the originating port on analyzer 406 that received the frame, and the timestamp of the error at the time at which the "C" frame was seen on analyzer 410. In other words, the timestamp at which the first out order frame is identified at analyzer 410. A "value 1" could be added to contain the timestamp of the original "B" frame and "value 2" time could be added to contain the delta time between the original "B" frame at analyzer 406 and the out of order "C" frame at analyzer 410. These values can then be used in conjunction with a trace viewer to identify the frame that triggered an out of order error.

Figure 5:
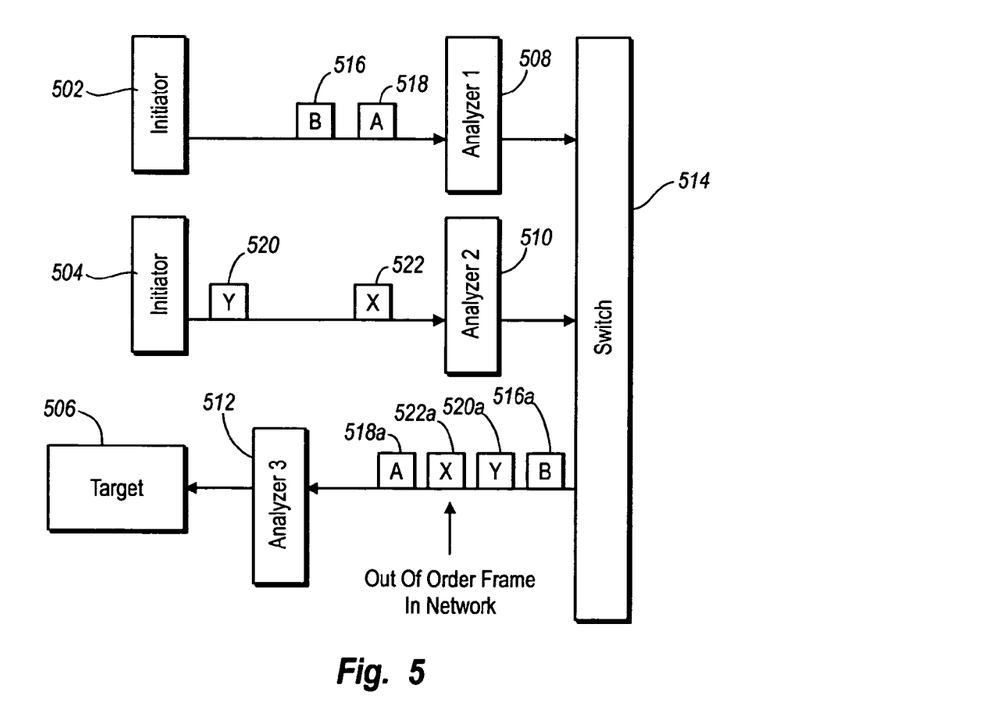
FIG. 5 illustrates the detection of an out of order frame in a complex network topology according to one embodiment of the invention.

Referring now to FIG. 5, FIG. 5 depicts an example networked system related to the detection of out of order frames in networked traffic. In this example, the cross-port methods of the invention monitor the frame ordering for in-order delivery across all of the ports. The methods identify errors whenever a frame is re-ordered or dropped for a source/destination pair (out of order frame by Src/Dst) or when the network reorders frames for multiple ports or destinations (out of order frame in network). For this example, the initiator 502 monitored by analyzer 508 sends frame A (518) and Frame B (516) to the target 506 via switch 514. At almost the same time, the initiator 504 monitored by analyzer 510 sends frame X (522) and frame Y (520) to the same target 506. These frames should be delivered to the target in the order A, X, B, Y. Instead, they get delivered as A, X, Y, B (518a, 522a, 520a, 516a). When this occurs, the methods of the invention produce an "out of order frame in network" warning. In this situation, the warning will preferably be produced with the following properties: the originating port on analyzer 510 that received a frame; the delivery port on analyzer 512 that received the frame and detected the out of order situation; the timestamp of the error at which the "Y" frame was seen on analyzer 512; a Value 1 column containing the timestamp of the original "B" frame on Analyzer 508; and a Value 2 column containing the delta time between the original "B" frame (Analyzer 510) and the out of order "Y" frame (Analyzer 512). When an out of order frame in network situation is identified, the above values can be used in conjunction with other analysis systems, such as trace viewers, to identify the source of the problem Other metric calculations that can be performed with embodiments of the invention may include, for example, shortest path first verification. This would require cross-port stack analysis because there may be multiple ports delivering to one destination port. This would also require examining all of the possible port stacks on each frame to the destination port to identify if the current frame matches the earliest frame start time seen on any port. Other possible metric calculation may include, for example, frame size distribution versus latency time, sequence interleaving for a port, and bus utilization for a port.

Computing Environments

In at least some cases, some or all of the functionality disclosed herein may be implemented in connection with various combinations of computer hardware and software. For example, at least some devices use hard coded devices such as field programmable gate arrays ("FPGA") to implement pattern generation, injection, trace capture, and data correlation functionality. Other devices employ both hardware and software to implement various functions disclosed herein.

With respect to computing environments and related components, at least some embodiments of the present invention may be implemented in connection with a special purpose or general purpose computer that is adapted for use in connection with communications systems. Embodiments within the scope of the present invention also include computer-readable media for carrying or having computer-executable instructions or electronic content structures stored thereon, and these terms are defined to extend to any such media or instructions for use with devices such as, but not limited to, link analyzers and multi-link protocol analyzers.

By way of example such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such connection is properly termed a computer-readable medium. Combinations of the above should also be included within the scope of computer-readable media. Computer-executable instructions comprise, for example, instructions and content which cause a general purpose computer, special purpose computer, special purpose processing device, such as link analyzers and multi-link protocol analyzers, or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for analyzing a network, comprising:
providing a plurality of analyzers in a communication network, wherein each analyzer is configured to monitor traffic to and from an element of the network and has a synchronized timestamp mechanism;
capturing a data trace with each of the plurality of analyzers so as to provide captured data traces;
adding timestamp information to the captured data traces with respective ones of the plurality of analyzers so as to provided time-stamped data traces;
utilizing the time-stamped data traces to determine the topology of the network; and
conducting an expert analysis process on the captured data traces.

2. A method as defined in claim 1, wherein at least one captured data trace comprises a two channel data trace capturing bidirectional network conversations.

3. A method as defined in claim 1, wherein a set of the captured data traces is purged of duplicate entries and is organized in chronological order by timestamp.

4. A method as defined in claim 1, wherein conducting the expert analysis comprises sequentially analyzing the captured data traces.

5. A method for analyzing a network, comprising:
providing a plurality of analyzers in a communication network, wherein each analyzer is configured to monitor traffic to and from an element of the network and has a synchronized timestamp mechanism;
capturing a data trace with each of the plurality of analyzers so as to provide captured data traces;
adding timestamp information to the captured data traces with respective ones of the plurality of analyzers so as to provided time-stamped data traces;
utilizing the time-stamped data traces to determine the topology of the network; and
conducting an expert analysis process on the time-stamped data traces,
wherein determining the topology of the network from the master data trace comprises correlating frame source identifiers, frame destination identifiers from selected frames within the captured data traces to verify that a frame has covered a determined path within the topology.

6. A method as defined in claim 1, further comprising, upon detecting a network error through the expert analysis, generating a warning.

7. A method as defined in claim 1, wherein the expert analysis process comprises determining a transmission latency between two of the analyzers.

8. A method as defined in claim 1, wherein the expert analysis process comprises identification of pending frames.

9. A method as defined in claim 1, wherein the expert analysis process comprises detection of at least one of out of order frames between a source and a destination and out of order frames in networked traffic.

10. A computer program product for implementing a method for analyzing a network, the computer program product comprising a physical storage computer readable medium carrying computer executable instructions for performing the method of claim 1.

11. A computer program product for implementing a method for analyzing a network, the computer program product comprising a physical storage computer readable medium carrying computer executable instructions for performing the method of claim 5.

12. A method as defined in claim 1, wherein the expert analysis process is selected from the group consisting of: shortest path first verification, frame size distribution versus latency time, sequence interleaving for a port, and bus utilization for a port.

13. A method as defined in claim 1, wherein the expert analysis process comprises detection of out-of-order frames in networked traffic.

* * * * *